US012570244B2

(12) United States Patent
Fox

(10) Patent No.: US 12,570,244 B2
(45) Date of Patent: Mar. 10, 2026

(54) VEHICLE WASHING ASSEMBLY

(71) Applicant: Alexei T. Fox, Clarks Summit, PA (US)

(72) Inventor: Alexei T. Fox, Clarks Summit, PA (US)

( * ) Notice: Subject to any disclaimer, the term of this patent is extended or adjusted under 35 U.S.C. 154(b) by 503 days.

(21) Appl. No.: 18/312,567

(22) Filed: May 4, 2023

(65) Prior Publication Data

US 2023/0415707 A1    Dec. 28, 2023

Related U.S. Application Data

(60) Provisional application No. 63/366,838, filed on Jun. 22, 2022.

(51) Int. Cl.
B60S 3/04 (2006.01)
B05B 15/62 (2018.01)
B08B 3/02 (2006.01)

(52) U.S. Cl.
CPC .............. B60S 3/044 (2013.01); B05B 15/62 (2018.02); B08B 3/026 (2013.01)

(58) Field of Classification Search
CPC ....... B60S 3/044; B05B 15/62; B05B 15/652; B08B 3/026
USPC ....... 239/273, 280, 282, 525, 526, 532, 751; 134/123
See application file for complete search history.

(56) References Cited

U.S. PATENT DOCUMENTS

| | | | |
|---|---|---|---|
| 3,044,088 A | | 7/1962 | Anderson |
| 3,139,096 A | * | 6/1964 | Harris ........................ B60S 3/04 |
| | | | 134/123 |
| 3,228,613 A | | 1/1966 | Goldstein |
| 3,401,707 A | * | 9/1968 | Horwitz .................. B60S 3/044 |
| | | | 134/123 |
| 4,056,229 A | * | 11/1977 | Jones ...................... B05B 15/62 |
| | | | 239/559 |
| 4,796,808 A | | 1/1989 | Linda et al. |
| 4,976,072 A | * | 12/1990 | Hicks ...................... B60S 3/045 |
| | | | 239/282 |
| 5,284,298 A | | 2/1994 | Haynes et al. |
| 2009/0133726 A1 | | 5/2009 | Montoya et al. |

* cited by examiner

*Primary Examiner* — Steven J Ganey
(74) *Attorney, Agent, or Firm* — Lawrence P. Zale; Zale Patent Law, Inc.

(57) ABSTRACT

A vehicle washing assembly holds a hose used for washing a vehicle away from the vehicle to minimize scratching and make it easier to manipulate the hose. The vehicle washing assembly employs an anchor suction cup attached to a vehicle's window to be cleaned. A connection body connects to the anchor suction cup, which fluidically connects a lower hose to an upper conduit that extends well above the vehicle roof. A stabilizing bar is also attached to the anchor suction cup and extends upward. A clamp attaches the upper conduit to the stabilizing bar stabilizing the upper conduit. A second hose is connected to the upper end of the upper conduit that is used to wash the vehicle. The upper conduit keeps the hose well away from the vehicle and allows it to move freely around the vehicle.

20 Claims, 8 Drawing Sheets

VEHICLE WASHING ASSEMBLY

CROSS-REFERENCE TO RELATED APPLICATIONS

This application claims benefit of U.S. Patent Application No. 63/366,838, filed on Jun. 22, 2022, the disclosure of which is hereby incorporated by reference in its entirety to provide continuity of disclosure to the extent such disclosure is not inconsistent with the disclosure herein.

STATEMENT REGARDING FEDERALLY SPONSORED RESEARCH

Not applicable.

BACKGROUND

1. Field of Invention

The present invention relates to an assembly for facilitating the washing of vehicles or other similar structures, and more specifically, an assembly for facilitating the washing of vehicles or structures which require high-quality detailing.

2. Description of Related Art

General Info

Typically, a garden or high-pressure hose is used to spray water on the vehicle during the vehicle washing process. Typically, the hoses are long and, when filled with water, are bulky and difficult to manage, especially when filled with high-pressure water. Furthermore, since the hose will drag along the ground, it picks up dirt and/or other debris. If the user drags the hose over the vehicle's surface, the dirt and/or other debris can scratch the finish on the vehicle's surface. Therefore, there is currently a need in the vehicle cleaning art to be able to manage the hose when washing a vehicle or other structures.

It is known that there have been several attempts in the past to address this problem, such as U.S. Pat. No. 3,228,613 Goldstein. Goldstein has a heavy base with a vertical conduit extending upward from the base. The upper end of the vertical conduit has a flexible joint connected to a curved upper pipe and a nozzle. The vertical conduit has a side connection for the hose. The base should be sufficiently heavy to steady the hose, the flexible joint, the nozzle, and the force from the water spraying from the nozzle. However, this design would have to be mounted on the roof of the vehicle or structure. Consequently, this design would be heavy and hard to lift to the roof. Furthermore, this design could also scratch or dent the roof of the vehicle.

A similar attempt was made, as shown in the published patent application U.S. 2009/0133726 A1 Montoya et al. Montoya employs a suction cup that is attached to the roof of the vehicle being washed. FIG. 7 of Montoya shows that although the portion of hose 140 near the nozzle is held away from the vehicle, the rear portion of hose 124 rests and rubs on the vehicle. Possibly, for basic washing, this may not be much of a problem, but this is not acceptable for professional vehicle detailing. This problem is amplified with the embodiment of FIG. 8, in which there is a swivel on the suction cup. As shown, the hose is repeatedly dragged over the vehicle's surface.

Both U.S. Pat. No. 5,284,298 "Fluid-Conducting Swivel and Method" Haynes, issued Feb. 8, 1994, and U.S. Pat. No. 5,671,954 "Swivel Connector for Nozzle and Garden Hose"

Cheramie, issued Sep. 30, 1997, describe swivel connections for hoses that may be used in a system that manages hoses.

U.S. Pat. No. 3,044,088, "Rotating Tire Cleaner," issued Jul. 13, 1960, discloses using a suction cup to secure a device used to clean a vehicle's wheels. This patent is directed to the radial symmetry of the tire and has little application to surfaces that are not radially symmetric.

U.S. Pat. No. 4,796,808 "Truck Bumper Mountable Water Sweeper", Linda, issued Jan. 10, 1989, discloses a gutter water sweeping apparatus that attaches to a truck bumper.

While these known systems and methods disclose some parts which may be used to manage a hose, these known systems and methods lack the necessary disclosure of other elements, functions, and motivation to combine the required parts into a complete and functioning vehicle cleaning system, especially for a vehicle or structure cleaning system and method necessary for high-quality detailing.

Currently, there is a need for an assembly that can manage the hose during the high-quality detailing process without causing it to scratch the vehicle or structure or ruin the finish of the vehicle or structure.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF A PREFERRED EMBODIMENT

Theory

One of the basic rules of cleaning and 'detailing' cars is not to use equipment that may damage or scratch the vehicle. As discussed earlier, the Goldstein reference requires the use of a heavy base placed on a flat surface which may scratch the vehicle's finish if it is moved.

Another basic rule of cleaning and 'detailing' cars is that the hose must be easily moved about the vehicle without touching or rubbing against the vehicle.

It is to be further understood that the device must not be limited to use on a radially symmetric object. It should be able to be used on various shapes of vehicles and other structures.

Large suction cups are effective at temporarily anchoring to flat surfaces of a vehicle. However, due to their size and strength required, they have been known to remove or scratch the paint of vehicles when being removed.

Implementation

In the following figures, the same parts have the same reference numbers and function in the same manner across all figures and related descriptions.

Figure 1:
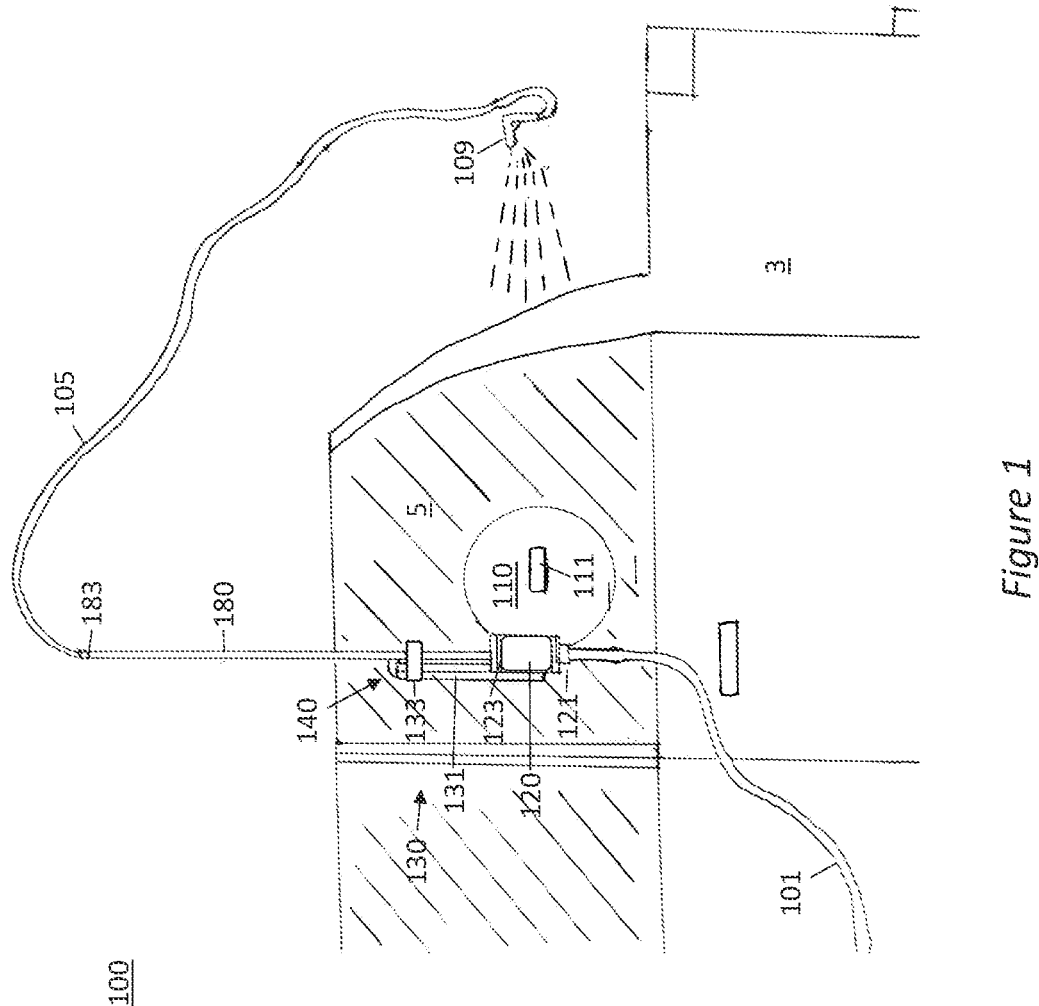
FIG. 1 is a front elevational view of a vehicle washing assembly, according to the current invention as it would appear in operation.

FIG. 1 is a front elevational view of a vehicle washing assembly 100, according to the current invention as it would appear in operation. Vehicle 3 is being washed. Vehicle 3 has a window 5. It is to be understood that assembly 100 could also be used on other similar structures such as campers, small buildings, small greenhouses, sheds, small trailers, etc.

A large anchor suction cup 110 is removably attached to window 5 of vehicle 3, which is used to stabilize the vehicle washing assembly 100. For larger suction cups, there is a lever 111, which actuates the suction cup. It is to be understood that suction cups 110 and 141 (FIG. 3) could also be attached to other similar structures, such as a side of a structure or a window in the structure, in order to allow the washing assembly 100 to clean these other similar structures.

The connection body 120 has an upper attachment 123 and a lower attachment 121. An upper conduit 180 is attached to the upper attachment 123 and then extends vertically upward away from the roof of vehicle 3. This upper conduit 180 is preferably constructed of a rigid material such as non-corrosive metal. The upper conduit 180 has a central passageway capable of allowing the passing of a fluid such as water.

A stabilizing assembly 130 which includes a stabilizing bar 131 and clamp 133, is also attached at a lower end to anchor suction cup 110. Stabilizing bar 131 is also constructed of a rigid material and extends partially along a length of upper conduit 180. Stabilizing bar 131 has an upper end attached to an upper stabilizer 140.

Upper stabilizer 140 also secures vehicle washing assembly 100 to vehicle 3. This second point of stability stops vehicle washing assembly 100 from sliding downward and prevents vehicle washing assembly 100 from moving or side to side.

Figure 4:
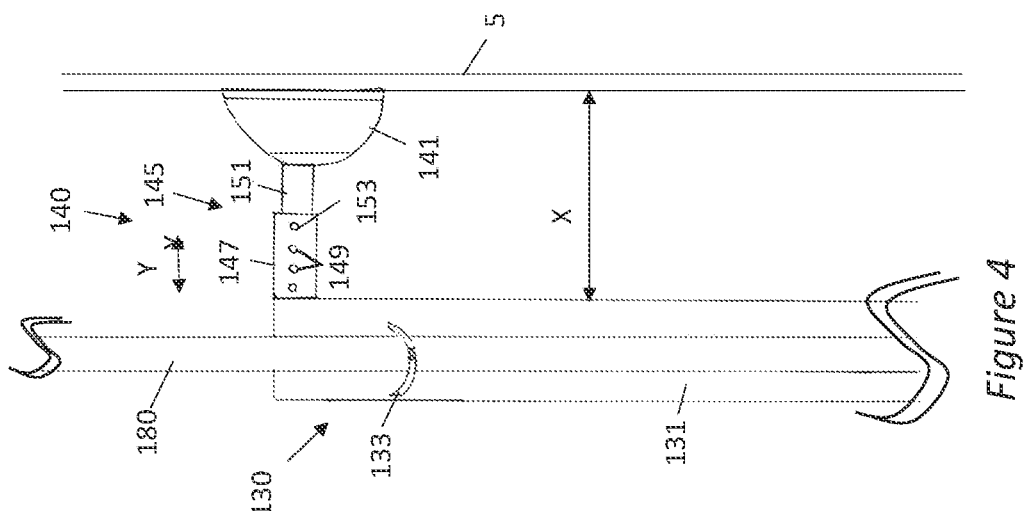
FIG. 4 is an enlarged illustration of a telescoping adjustment assembly of the upper stabilizer, according to one embodiment of the current invention.

Upper stabilizer 140 may be embodied in one of several different ways. One such embodiment is shown in FIG. 4.

A clamp 133 located at the upper end of stabilizing bar 131 connects to and secures upper conduit 180 to stabilizing bar 131.

Attached to upper conduit 180 is upper hose attachment 183. Upper hose 105 is connected at one end to upper hose attachment 183. Finally, the other end of upper hose attachment 183 is removably connected to a conventional spray nozzle 109. Attached to the lower attachment 121 of connection body 120 is lower hose 101. It is to be understood that lower hose 101 can be used to provide water or other similar liquids from a conventional water source (not shown) or a pressurized water source such as a pressure washer (not shown).

Figure 2:
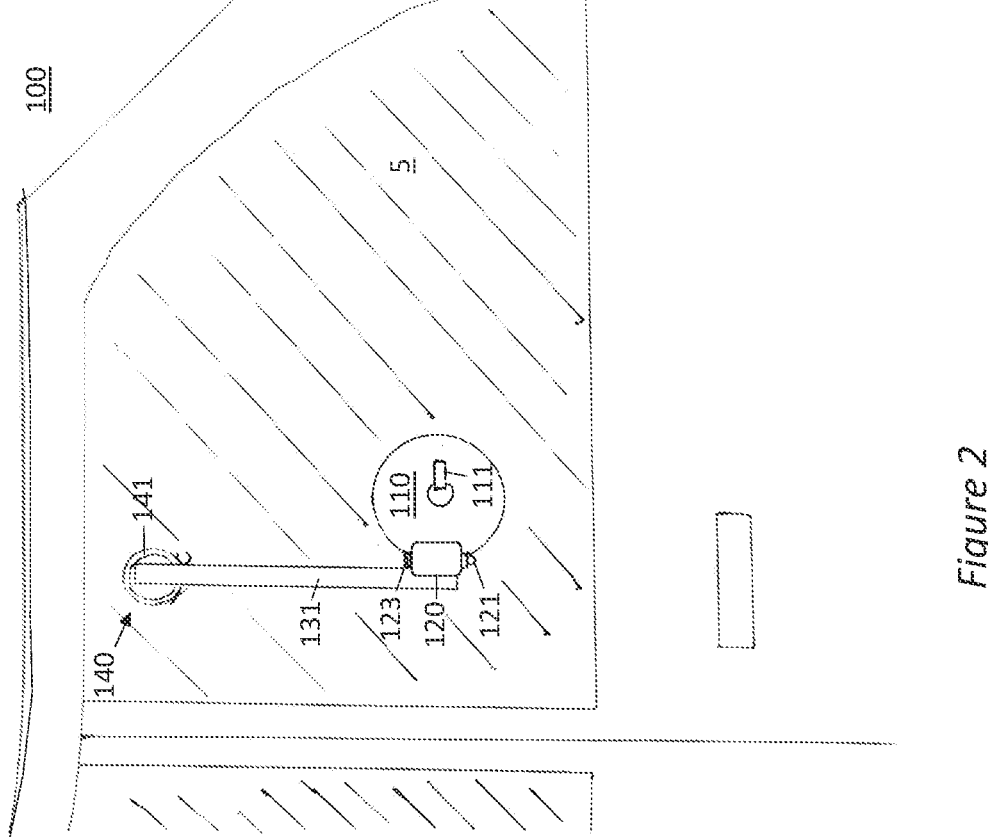
FIG. 2 is a front elevational view of a portion of the vehicle washing assembly, according to the current invention.

FIG. 2 is a front elevational view of a portion of the vehicle washing assembly 100, according to the current invention. As shown in FIG. 2, the anchor suction cup 110 is removably attached to vehicle window 5. Also, the connection body 120 has a lower attachment 121 and an upper attachment 123. Also, FIG. 2 shows the stabilizing bar 131 connected at its lower end to anchor suction cup 110 and its upper end to upper stabilizer 140. This embodiment of the stabilizing assembly employs the upper suction cup 141. It is to be understood that the clamp 133, upper conduit 180, upper conduit 180, upper hose 105, lower hose 101, and other parts have been omitted from FIG. 2 to provide clarity as to how the stabilizing bar 131 is attached to the vehicle window 5.

Figure 3:
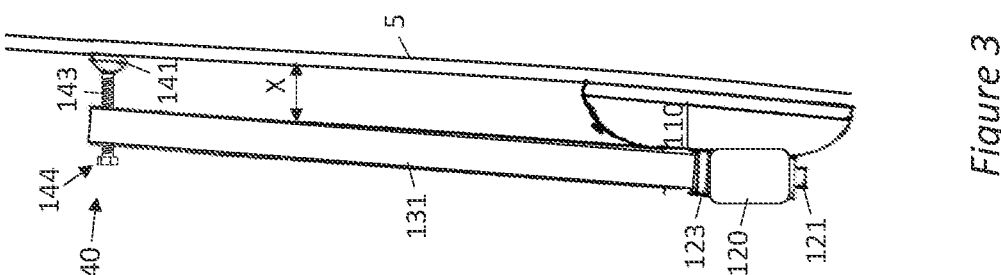
FIG. 3 is a side elevational view of a portion of the vehicle washing assembly, according to the current invention.

FIG. 3 is a side elevational view of a portion of the vehicle washing assembly 100, according to the current invention. In FIG. 3, the anchor suction cup 110 is shown as being removably attached to vehicle window 5. The stabilizing bar 131 has an upper end attached to the upper stabilizer 140. In this embodiment, the upper stabilizer 140 employs an upper suction cup 141. The lower end of the stabilizing bar 131 is connected to the anchor suction cup 110.

The connection body 120 is shown in FIG. 3 with its upper attachment 123 and lower attachment 121. It is to be understood that the upper conduit 180 and the lower hose 101 are omitted from FIG. 3 to provide more clarity as to how the stabilizing bar 131 is attached to vehicle window 5 by making the upper attachment 123 and lower attachment 121 visible.

A unique aspect of the present invention is shown in FIG. 3. In the embodiment of FIG. 3, upper stabilizer 140 employs a threaded bolt 143, which is threadedly connected to stabilizing bar 131. In one embodiment, threaded bolt 143 can be secured with a locknut 144 or other suitable adjustment device to adjustably change a distance (X) between vehicle window 5 and stabilizing bar 131. This adjustment, built into this embodiment of the upper stabilizer 140, allows vehicle washing assembly 100 to be used on various vehicles or other structures, each having different angles to the window 5. However, it is to be understood that other types of upper stabilizers 140 may be used within the spirit of the present invention.

FIG. 4 shows an alternative embodiment of another adjustable upper stabilizer 140. In particular, FIG. 4 is an enlarged illustration of a telescoping adjustment assembly 145 of the upper stabilizer 140, according to one embodiment of the current invention.

As shown in FIG. 4, this embodiment shows an upper suction cup 141 removably attached to window 5. The telescoping adjustment assembly 145 employs an inner bar 151 sized and shaped to fit inside outer bar 147. There is a plurality of holes 149 conventionally formed along a length of outer bar 147. Inner bar 151 has at least one spring-loaded catch pin 153.

Another unique aspect of the present invention is the use of telescoping adjustment assembly 145. In particular, the user may conventionally push in catch pin 153 to allow inner bar 151 to slide relative to outer bar 147 along the directions of arrow Y. When catch pin 153 is at its desired relative position, the catch pin 153 is allowed to pop out and extend through one of the holes 149 in outer bar 147, thereby securing outer bar 147 relative to inner bar 151. In this manner, telescoping adjustment assembly 145 allows for adjustment of the distance (X) between window 5 and stabilizing bar 131 and upper conduit 180. Furthermore, telescoping adjustment assembly 145 allows vehicle washing assembly 100 to be adjustable and fit various vehicles or structures with differently shaped windows.

Figure 5:
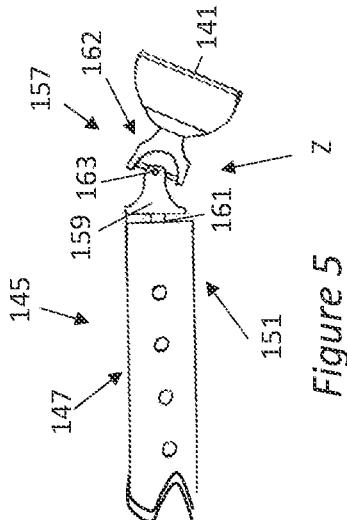
FIG. 5 is an illustration of a telescoping adjustment assembly of the upper stabilizer, including a pivoting adjustment, according to another embodiment of the current invention.

FIG. 5 shows a telescoping adjustment assembly 145 of the upper stabilizer 140, including a pivoting adjustment 157, according to another embodiment of the current invention. It is to be understood that the embodiment shown in FIG. 5 may employ the telescoping adjustment 145 of FIG. 4.

Another unique aspect of the present invention is that since vehicles or other structures have windows 5 that vary in vertical angles, the embodiment shown in FIG. 5 also includes a pivoting head 163. This embodiment allows the suction cup 141 to pivot about an axis (Z). The pivot head 163 is mounted upon a threaded member 159, which is threadedly connected to a threaded receptacle 161 located on the end of inner bar 151 (or threaded receptacle 161 can be attached directly to the end of outer bar 147). A pivot cup 162 is conventionally connected to the suction cup 141. This allows the pivot head 163 to rotate in the pivot cup 162 so that the suction cup 141 can rotate to any angle to match up flat against window 5.

Figure 6:
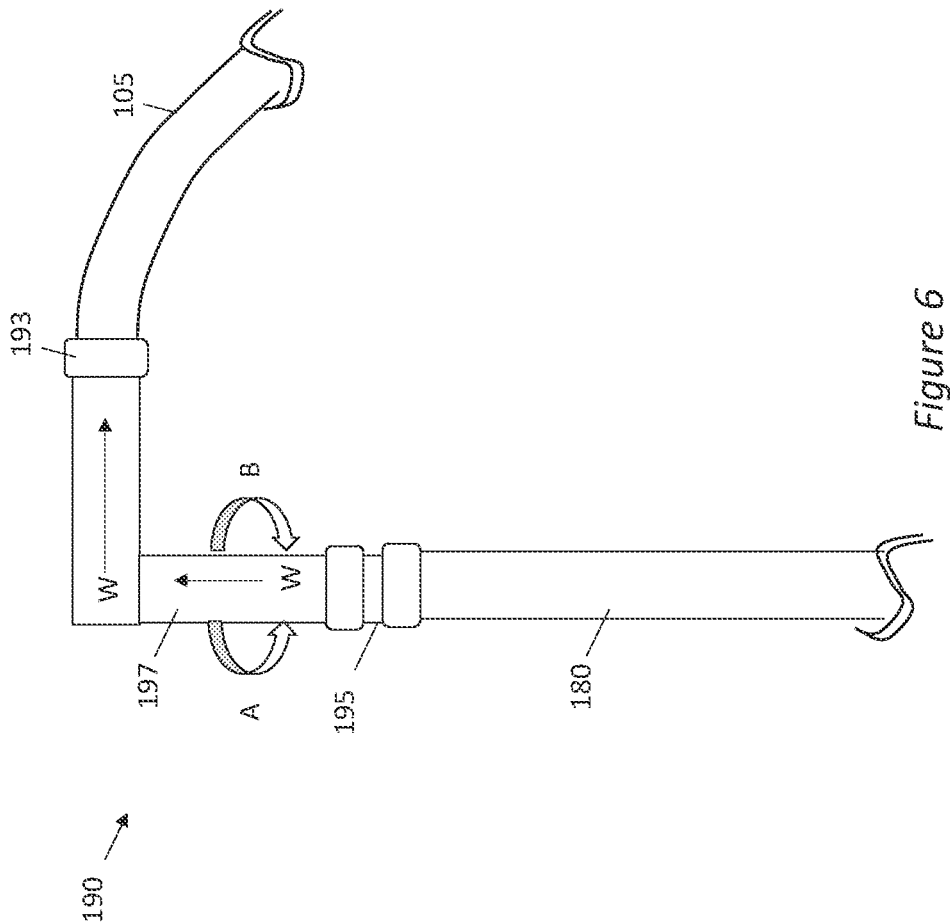
FIG. 6 is a front elevational view of the upper portion of the upper conduit having an optional swivel assembly, according to one embodiment of the current invention.

FIG. 6 is a front elevational view of the upper portion of the upper conduit 180 having an optional swivel assembly 190. Swivel assembly 190 has a swivel structure 197, which has an internal conduit that redirects the water it receives from a vertical direction to a horizontal direction along the directions of arrows W.

Another unique aspect of the present invention is that swivel structure 197 is capable of making a water-tight seal with the upper hose 105 at the upper hose attachment 193. As the user pulls upper hose 105 in different directions while washing vehicle 3 or other similar structures, the upper hose 105 and swivel structure 197 are allowed to pivot, as shown by arrows "A" and "B" in FIG. 6. This swivel structure 197 effectively allows the user to easily manage the upper hose 105 while keeping it a safe distance above vehicle 3 or other similar structures. As shown in FIG. 6, swivel structure 197 includes swivel joint 195, which fluidically connects to upper conduit 180 and allows upper hose 105 to rotate in the directions marked by arrows "A" and "B".

Figure 7:
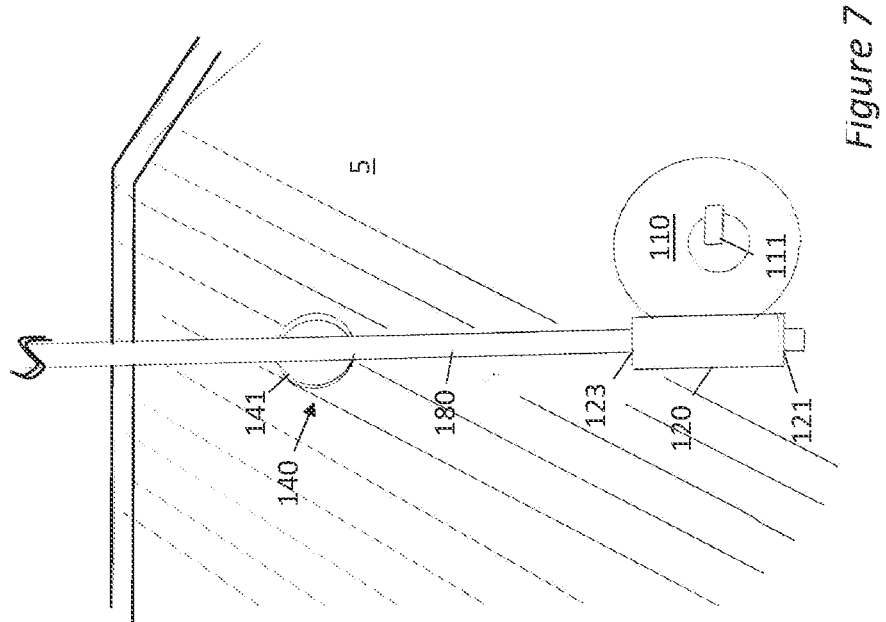
FIG. 7 is a front elevational view of a portion of the vehicle washing assembly, according to another embodiment of the current invention.

FIG. 7 is a front elevational view of a portion of the vehicle washing assembly 100, according to another embodiment of the current invention. The embodiment of FIG. 7 is similar to the embodiment of FIG. 2, except that the upper conduit 180 is made with thicker walls to make it stronger. Upper conduit 180 is now designed to be strong enough to replace the stabilizing bar 131 (FIG. 2).

As shown in FIG. 7, the upper stabilizer 140 with suction cup 141 is attached directly to the upper conduit 180. This results in fewer parts and easier assembly. It is to be understood that the telescoping adjustment assembly 145 (FIG. 4) and the pivoting adjustment (FIG. 5) can also be utilized with the upper stabilizer 140 with suction cup 141, shown in FIG. 7.

Figure 8:
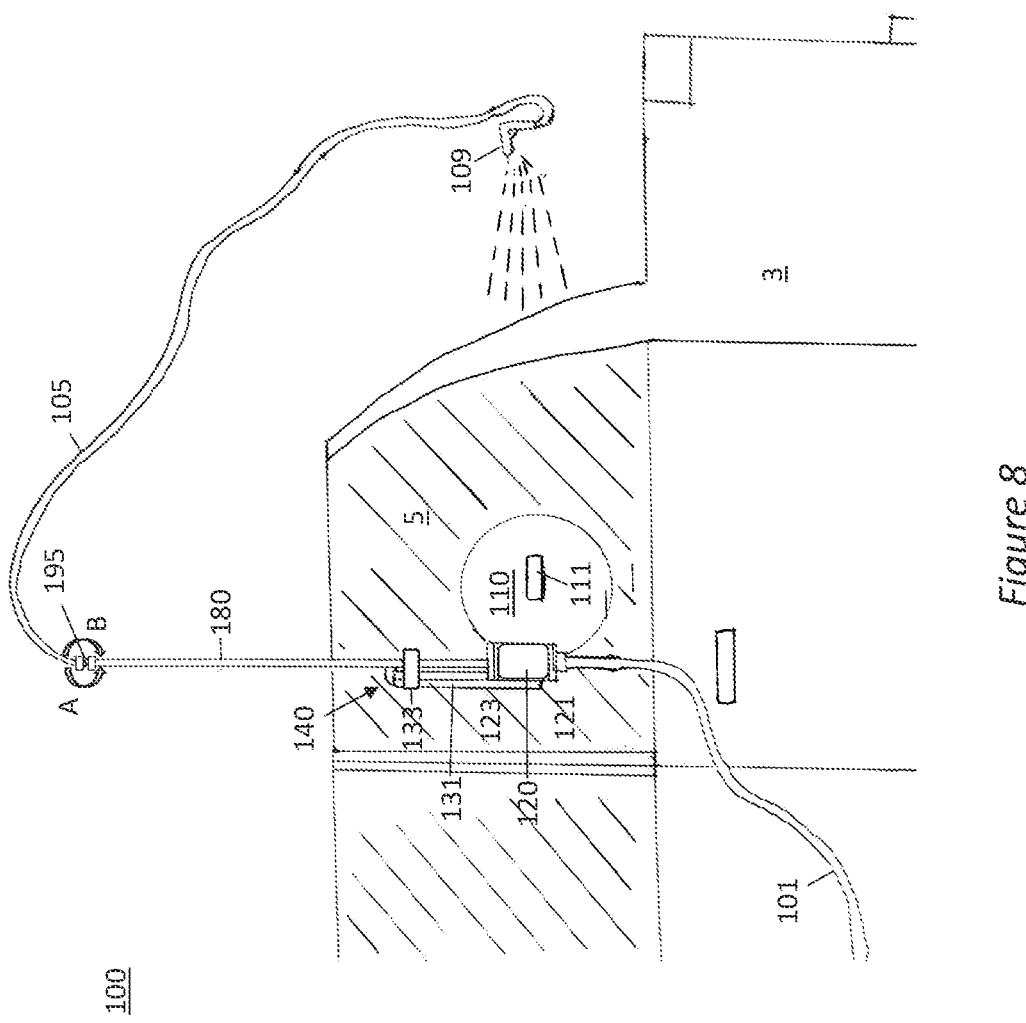
FIG. 8 is a front elevational view of another embodiment of a vehicle washing assembly, according to the current invention as it would appear in operation.

FIG. 8 is a front elevational view of another embodiment of a vehicle washing assembly 100, according to the current invention as it would appear in operation. As shown in FIG. 8, the embodiment of FIG. 8 is similar to the embodiment shown in FIG. 1. However, in this embodiment, the swivel joint 195 replaces upper hose attachment 183. Swivel joint 195 is fluidically connected to upper hose 105 and allows upper hose 105 to rotate in the directions marked by arrows "A" and "B", as discussed earlier.

Figure 9:
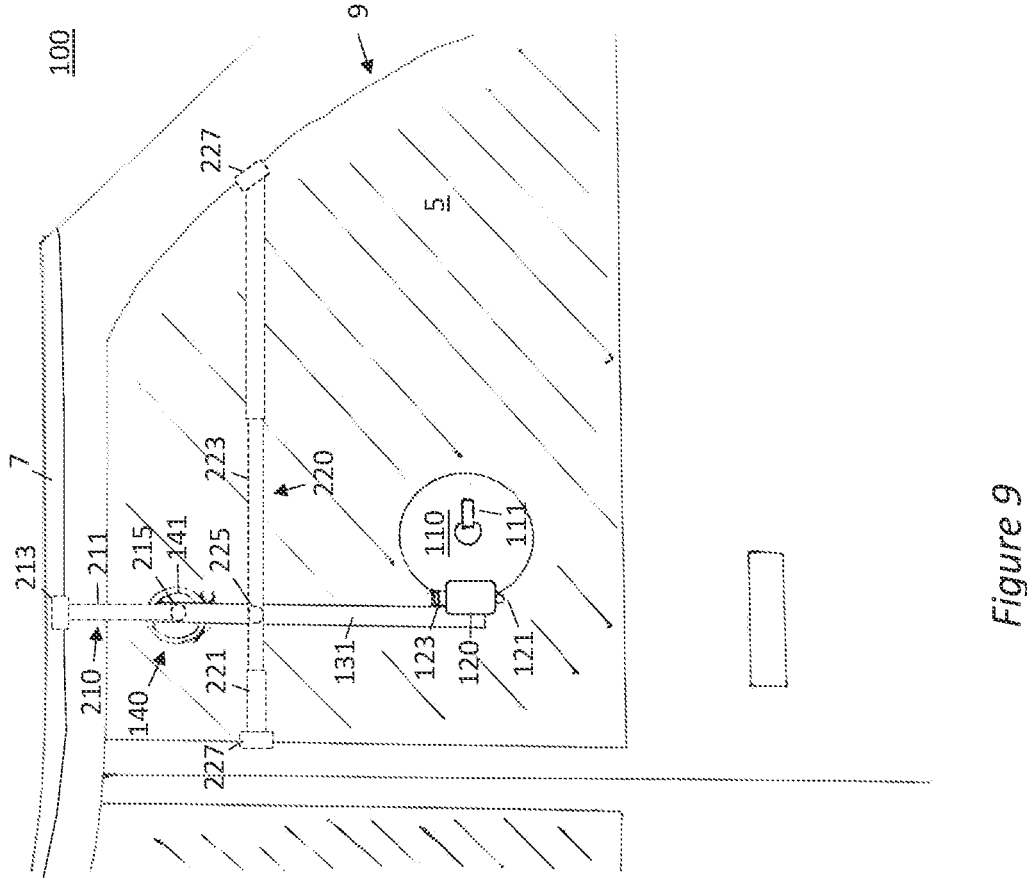
FIG. 9 is a front elevational view of a portion of another embodiment of the vehicle washing assembly, according to the current invention.

FIG. 9 is a front elevational view of a portion of another embodiment of the vehicle washing assembly 100, according to the current invention. The elements of this embodiment are shown in dashed lines.

The embodiment of FIG. 9 is similar to the embodiment shown in FIG. 2. However, FIG. 9 adds a rain gutter stabilizer 210 that includes an extendable arm 211 connected to the upper stabilizer 140 with a pivoting attachment 215. Pivoting attachment 215 allows extendable arm 211 to attach to a vehicle rain gutter 7 at various angles.

Extendable arm 211 can be any conventional structure having a variable length. A gutter clamp 213 at the end of extendable arm 211 releasably clamps onto the vehicle rain gutter 7. Any conventional spring clamp or attachment may be used. The gutter clamp 213 is preferably coated with a soft material that will not harm the finish of the rain gutter.

The window side support 220 employs two extendable side arms, 221 and 223. The extendable side arms 221 and 223 can be any conventional support capable of extending and contracting to fit various window frames. The extendable side arms 221 and 223 extend outward to each side of frame 9 of window 5. It is to be understood that window frame 9 may be part of the vehicle's door or part of the vehicle's body.

There are window frame attachments 227 connected to the ends of the extendable side arms 221 and 223, which can be removably attached to the window frame 9 to secure the extendable side arms 221, and 223 to the window frame 9. In this manner, the rain gutter stabilizer 210 and the window side supports 220 may be used together or individually to add support to the vehicle washing system 100.

Figure 10:
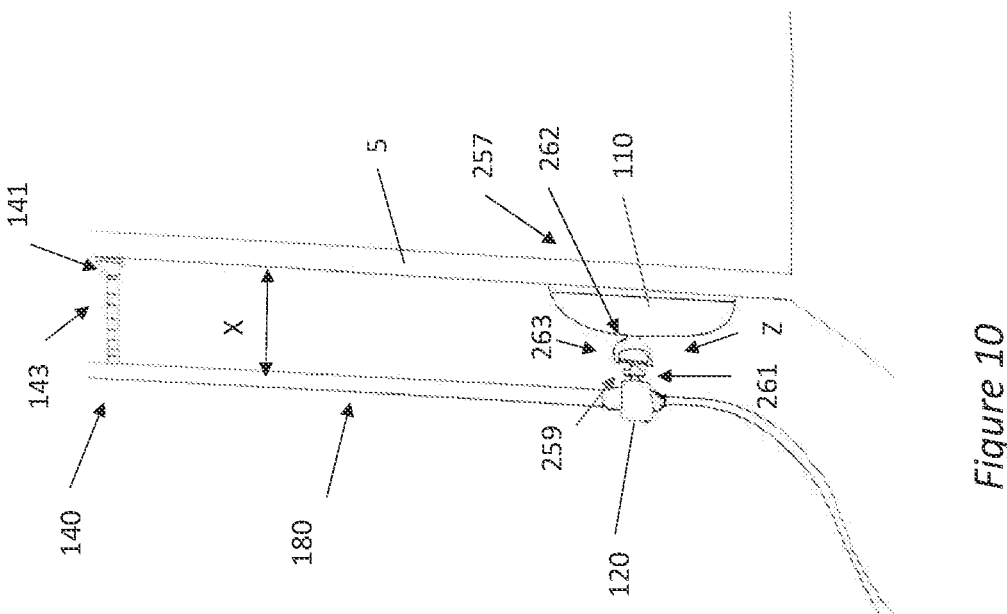
FIG. 10 is a side elevational view of another embodiment of a portion of the vehicle washing assembly, according to the current invention.

FIG. 10 shows another embodiment of a pivoting adjustment assembly 257 being attached to connection body 120, according to another embodiment of the current invention. A unique aspect of the present invention is shown in FIG. 10. In the embodiment of FIG. 10, upper stabilizer 140 employs a threaded bolt 143, which is threadedly connected to upper conduit 180 and suction cup 141. It is to be understood that the threaded bolt 143 could also be connected to a stabilizing bar 131 in a similar manner as shown in FIG. 3. In one embodiment, threaded bolt 143 can be secured with a locknut (similar to locknut 144 in FIG. 3) or other suitable adjustment device to adjustably change a distance (X) between window 5 and upper conduit 180. This adjustment, built into this embodiment of the upper stabilizer 140, allows vehicle washing assembly 100 to be used on various vehicles or structures, each having different angles to the window 5. However, it is to be understood that other types of upper stabilizers 140 may be used within the spirit of the present invention.

Another unique aspect of the present invention is that since vehicles have windows 5 that vary in vertical angles, the embodiment shown in FIG. 10 also includes a pivot head 263. This embodiment allows the anchor suction cup 110 to pivot about an axis (Z). The pivot head 263 is mounted upon a threaded member 259, which is threadedly connected to a threaded receptacle 261 located on connection body 120. A pivot cup 262 is conventionally connected to the suction cup 110. This allows the pivot head 263 to rotate in the pivot cup 262 so that the suction cup 110 can rotate to any angle to match up flat against window 5.

While the present disclosure illustrates various aspects of the present teachings, and while these aspects have been described in some detail, it is not the intention of the applicant to restrict or in any way limit the scope of the claimed systems and methods to such detail. Additional advantages and modifications will readily appear to those skilled in the art. Therefore, the teachings of the present application, in its broader aspects, are not limited to the specific details and illustrative examples shown and described. Accordingly, departures may be made from such details without departing from the spirit or scope of the teachings of the present application. Moreover, the aspects of this disclosure are illustrative, and no single feature or element is essential to all possible combinations that may be claimed in this or a later application.

What is claimed is:

1. A vehicle washing assembly for aiding in washing a vehicle, comprising:
   a) a first suction cup adapted to removably attach to a window of the vehicle,
   b) a connection body, wherein the connection body is operatively connected to the first suction cup, and wherein the connection body further comprises;
      i) a central conduit having a first and second end,
      ii) a lower attachment fluidically connected to a first end of the central conduit and the connection body such that the lower attachment is operatively connected to the first suction cup, and
      iii) an upper attachment fluidically connected to a second end of the central conduit;
   c) a stabilizing assembly having a first end and a second end, wherein the first end of the stabilizing assembly is operatively connected to the connection body and the first suction cup;
   d) an upper conduit having a central opening and first and second ends, wherein the first end of the upper conduit is operatively connected to the stabilizing assembly and extends vertically above the vehicle;
   e) a second suction cup, wherein the second suction cup is operatively connected to the stabilizing assembly and the window of the vehicle;
   f) a first hose operatively connected to the lower attachment;
   g) a second hose having a first and second end, wherein the first end of the second hose is operatively connected to second end of the upper conduit such that the upper conduit holds the second hose away from the vehicle to allow easy management of the second hose; and
   h) a nozzle operatively connected to the second end of the second hose.

2. The vehicle washing assembly for aiding in washing a vehicle, according to claim 1, wherein the first suction cup further comprises:
   a first pivot adjustment assembly, wherein the first pivot adjustment assembly comprises;
      a first threaded receptacle operatively connected to the connection body,
      a first threaded member operatively connected to the first threaded receptacle,
      a first pivot head operatively connected to the first threaded member, and
      a first pivot cup operatively connected to the first suction cup, wherein the first pivot adjustment assembly allows the first pivot head to rotate in the first pivot cup so that the first suction cup can rotate to any angle to match up flat against the vehicle window.

3. The vehicle washing assembly for aiding in washing a vehicle, according to claim 1, wherein the stabilizing assembly further comprises:

a stabilizing bar located along a length of the upper conduit, wherein the stabilizing bar is operatively connected to the second suction cup; and
   a clamp, wherein the clamp is capable of retaining the stabilizing bar on the upper conduit.

4. The vehicle washing assembly for aiding in washing a vehicle, according to claim 1, wherein the second suction cup further comprises:
   a first telescoping assembly operatively connected to the second cup and the second end of the stabilizing assembly, wherein the telescoping assembly further comprises;
      a threaded fastener such that the threaded bolt is capable of adjustably changing a distance between the window and stabilizing assembly.

5. The vehicle washing assembly for aiding in washing a vehicle, according to claim 1, wherein the second suction cup further comprises:
   a second telescoping assembly, wherein the second telescoping assembly further comprises;
      an outer bar operatively connected to the stabilizing assembly;
      an inner bar slidably retained within the out bar and operatively connected at one end to the second suction cup;
      a plurality of holes located along a length of the outer bar; and
      a retaining mechanism operatively connected to the inner, wherein a distance between the window and the stabilizing assembly is capable of being changed by sliding the inner bar within the outer bar and retaining a desired distance length between the window and the stabilizing assembly through an interaction between the retaining mechanism and the plurality of holes.

6. The vehicle washing assembly for aiding in washing a vehicle, according to claim 1, wherein the second telescoping assembly further comprises:
   a second pivot adjustment assembly, wherein the second pivot adjustment assembly comprises;
      a second threaded receptacle operatively connected to one end of the outer bar,
      a second threaded member operatively connected to the first threaded receptacle,
      a second pivot head operatively connected to the second threaded member, and
      a second pivot cup operatively connected to the first suction cup, wherein the second pivot adjustment assembly allows the second pivot head to rotate in the second pivot cup so that the first suction cup can rotate to any angle to match up flat against the vehicle window.

7. The vehicle washing assembly for aiding in washing a vehicle, according to claim 1, wherein the upper conduit further comprises:
   a swivel assembly located between the upper conduit and the second hose, wherein the swivel assembly further comprises;
      a swivel joint which is capable of allowing the second hose to rotate around the upper conduit.

8. A method of constructing vehicle washing assembly for aiding in washing a vehicle, comprising:
   a) providing a first suction cup adapted to removably attach to a window of the vehicle, b) attaching a connection body to the first suction cup, and wherein the connection body further comprises;

i) a central conduit having a first and second end, ii) a lower attachment fluidically connected to a first end of the central conduit and the connection body such that the lower attachment is operatively connected to the first suction cup, and iii) an upper attachment fluidically connected to a second end of the central conduit;

c) attaching a stabilizing assembly having a first end and a second end to the connection body and the first suction cup;

d) providing an upper conduit having a central opening and first and second ends, wherein the first end of the upper conduit is operatively connected to the stabilizing assembly and extends vertically above the vehicle;

e) attaching a second suction cup to the stabilizing assembly and the window of the vehicle;

f) attaching a first hose to the lower attachment;

g) providing a second hose having a first and second end, wherein the first end of the second hose is operatively connected to second end of the upper conduit such that the upper conduit holds the second hose away from the vehicle to allow easy management of the second hose; and h) attaching a nozzle to the second end of the second hose.

9. The method, according to claim 8, wherein the providing the first suction cup step further comprises:

providing a first pivot adjustment assembly, wherein the first pivot adjustment assembly comprises;

a first threaded receptacle operatively connected to the connection body, attaching a first threaded member to the first threaded receptacle, attaching a first pivot head to the first threaded member, and attaching a first pivot cup to the first suction cup, wherein the first pivot adjustment assembly allows the first pivot head to rotate in the first pivot cup so that the first suction cup can rotate to any angle to match up flat against the vehicle window.

10. The method, according to claim 8, wherein the attaching the stabilizing assembly step further comprises:

attaching a stabilizing bar along a length of the upper conduit such that the stabilizing bar is operatively connected to the second suction cup; and attaching a clamp to the stabilizing bar, wherein the clamp is capable of retaining the stabilizing bar on the upper conduit.

11. The method, according to claim 10, wherein the attaching a second suction cup step further comprises:

providing a second telescoping assembly, wherein the second telescoping assembly further comprises;

attaching an outer bar to the stabilizing assembly;

retaining an inner bar slidably within the out bar and operatively connected at one end to the second suction cup;

locating a plurality of holes along a length of the outer bar; and attaching a retaining mechanism to the inner, wherein a distance between the window and the stabilizing assembly is capable of being changed by sliding the inner bar within the outer bar and retaining a desired distance length between the window and the stabilizing assembly through an interaction between the retaining mechanism and the plurality of holes.

12. The method, according to claim 11, wherein the providing a second telescoping assembly step further comprises:

providing a second pivot adjustment assembly, wherein the second pivot adjustment assembly comprises;

attaching a second threaded receptacle to one end of the outer bar, attaching a second threaded member to the first threaded receptacle, attaching a second pivot head to the second threaded member, and attaching a second pivot cup to the first suction cup, wherein the second pivot adjustment assembly allows the second pivot head to rotate in the second pivot cup so that the first suction cup can rotate to any angle to match up flat against the vehicle window.

13. The method, according to claim 8, wherein the attaching a second suction cup step further comprises:

attaching a first telescoping assembly to the second cup and the second end of the stabilizing assembly, wherein the telescoping assembly further comprises;

a threaded fastener such that the threaded bolt is capable of adjustably changing a distance between the window and stabilizing assembly.

14. The method, according to claim 8, wherein the providing an upper conduit step further comprises:

providing a swivel assembly located between the upper conduit and the second hose, wherein the swivel assembly further comprises;

a swivel joint which is capable of allowing the second hose to rotate around the upper conduit.

15. A structure washing assembly, comprising:

a) a first suction cup adapted to removably attach to a surface of a structure, b) a connection body, wherein the connection body is operatively connected to the first suction cup, and wherein the connection body further comprises;

i) a central conduit having a first and second end, ii) a lower attachment fluidically connected to a first end of the central conduit and the connection body such that the lower attachment is operatively connected to the first suction cup, and iii) an upper attachment fluidically connected to a second end of the central conduit;

c) a stabilizing assembly having a first end and a second end, wherein the first end of the stabilizing assembly is operatively connected to the connection body and the first suction cup;

d) an upper conduit having a central opening and first and second ends, wherein the first end of the upper conduit is operatively connected to the stabilizing assembly and extends vertically above the structure;

e) a second suction cup, wherein the second suction cup is operatively connected to the stabilizing assembly and the surface of the structure;

f) a first hose operatively connected to the lower attachment;

g) a second hose having a first and second end, wherein the first end of the second hose is operatively connected to second end of the upper conduit such that the upper conduit holds the second hose away from the structure to allow easy management of the second hose;

h) a swivel assembly located between the upper conduit and the second hose, wherein the swivel assembly further comprises;

a swivel joint which is capable of allowing the second hose to rotate around the upper conduit; and i) a nozzle operatively connected to the second end of the second hose.

16. The structure washing assembly, according to claim 15, wherein the first suction cup further comprises:

a first pivot adjustment assembly, wherein the first pivot adjustment assembly comprises;

a first threaded receptacle operatively connected to the connection body, a first threaded member operatively connected to the first threaded receptacle, a first pivot head operatively connected to the first threaded member, and a first pivot cup operatively connected to the first suction cup, wherein the first pivot adjustment assembly allows the first pivot head to rotate in the first pivot cup so that the first suction cup can rotate to any angle to match up flat against the surface of the structure.

17. The structure washing assembly, according to claim 15, wherein the stabilizing assembly further comprises:

a stabilizing bar located along a length of the upper conduit such that the stabilizing bar is operatively connected to the second suction cup; and a clamp, wherein the clamp is capable of retaining the stabilizing bar on the upper conduit.

18. The structure washing assembly, according to claim 17, wherein the second suction cup further comprises:

a second telescoping assembly, wherein the second telescoping assembly further comprises;

an outer bar operatively connected to the stabilizing assembly;

an inner bar slidably retained within the out bar and operatively connected at one end to the second suction cup;

a plurality of holes located along a length of the outer bar; and a retaining mechanism operatively connected to the inner, wherein a distance between the surface of the structure and the stabilizing assembly is capable of being changed by sliding the inner bar within the outer bar and retaining a desired distance length between the surface of the structure and the stabilizing assembly through an interaction between the retaining mechanism and the plurality of holes.

19. The structure washing assembly, according to claim 18, wherein the second telescoping assembly further comprises:

a second pivot adjustment assembly, wherein the second pivot adjustment assembly comprises;

a second threaded receptacle operatively connected to one end of the outer bar, a second threaded member operatively connected to the first threaded receptacle, a second pivot head operatively connected to the second threaded member, and a second pivot cup operatively connected to the first suction cup, wherein the second pivot adjustment assembly allows the second pivot head to rotate in the second pivot cup so that the first suction cup can rotate to any angle to match up flat against the surface of the structure.

20. The structure washing assembly, according to claim 15, wherein the second suction cup further comprises:

a first telescoping assembly operatively connected to the second cup and the second end of the stabilizing assembly, wherein the telescoping assembly further comprises;

a threaded fastener such that the threaded bolt is capable of adjustably changing a distance between the surface of the structure and stabilizing assembly.

* * * * *